March 14, 1967   J. D. KENNELLY   3,309,661
SIGNAL DEVICE
Filed Sept. 10, 1964   2 Sheets-Sheet 1
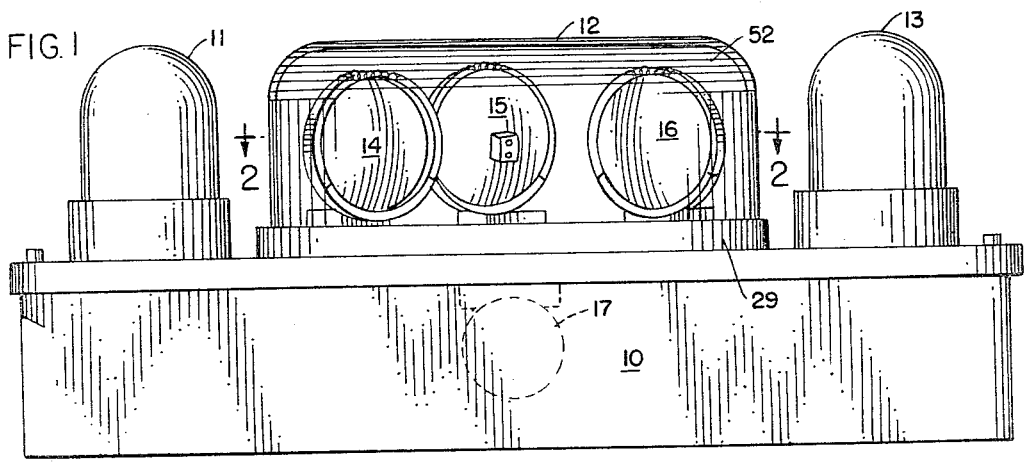
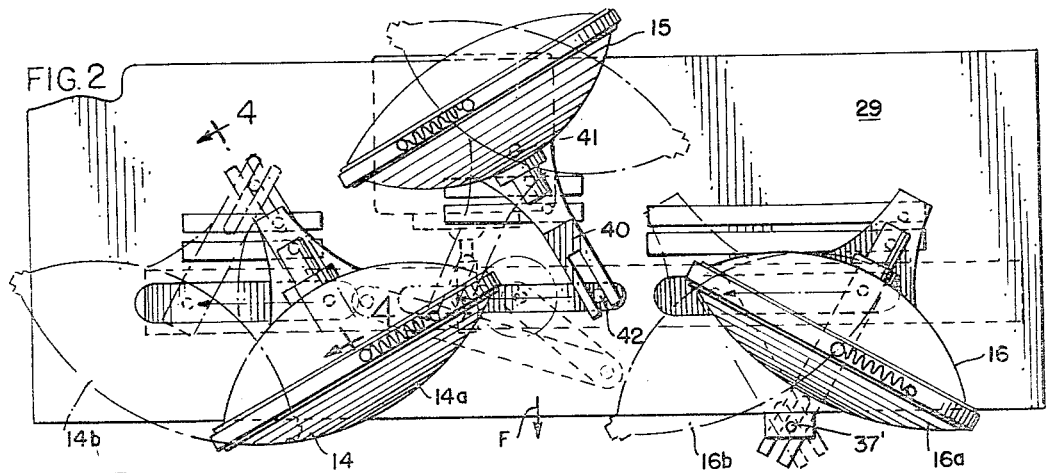
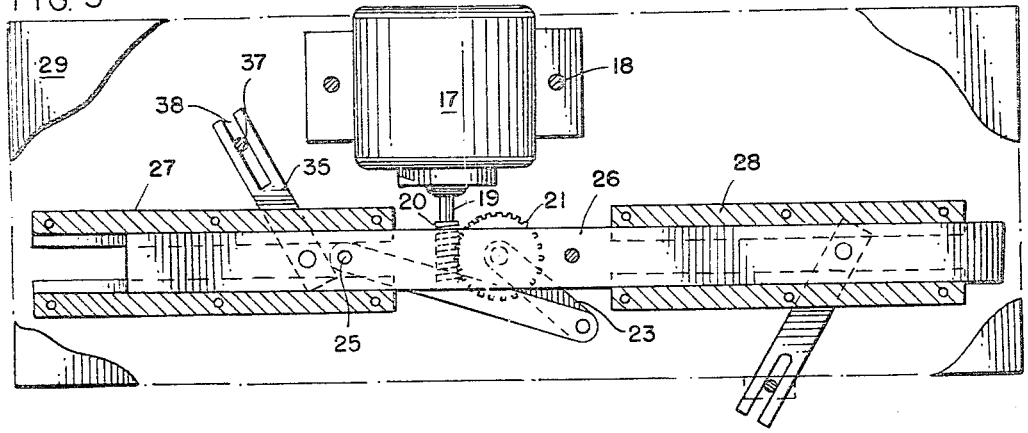
INVENTOR:
JEREMIAH D. KENNELLY
BY
Dawson, Tilton, Fallon, Lungmus & Alexander
ATT'YS

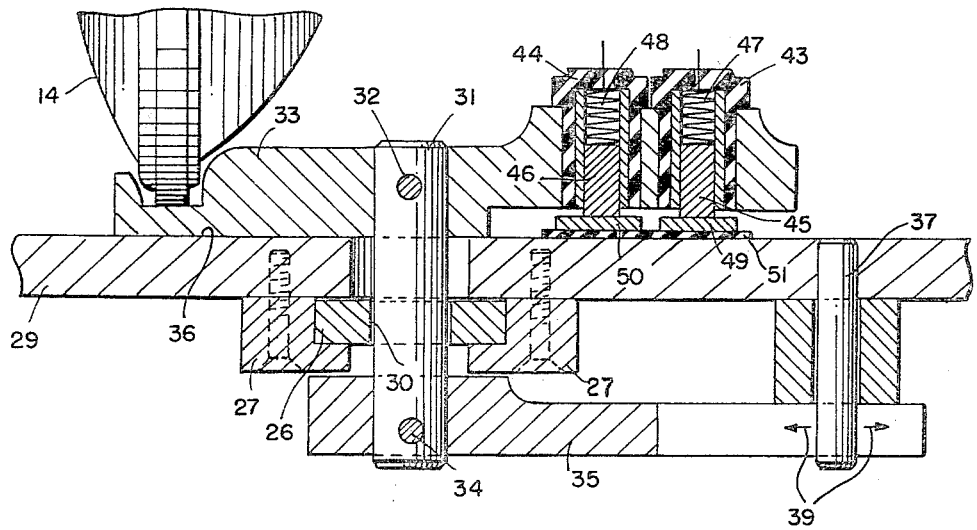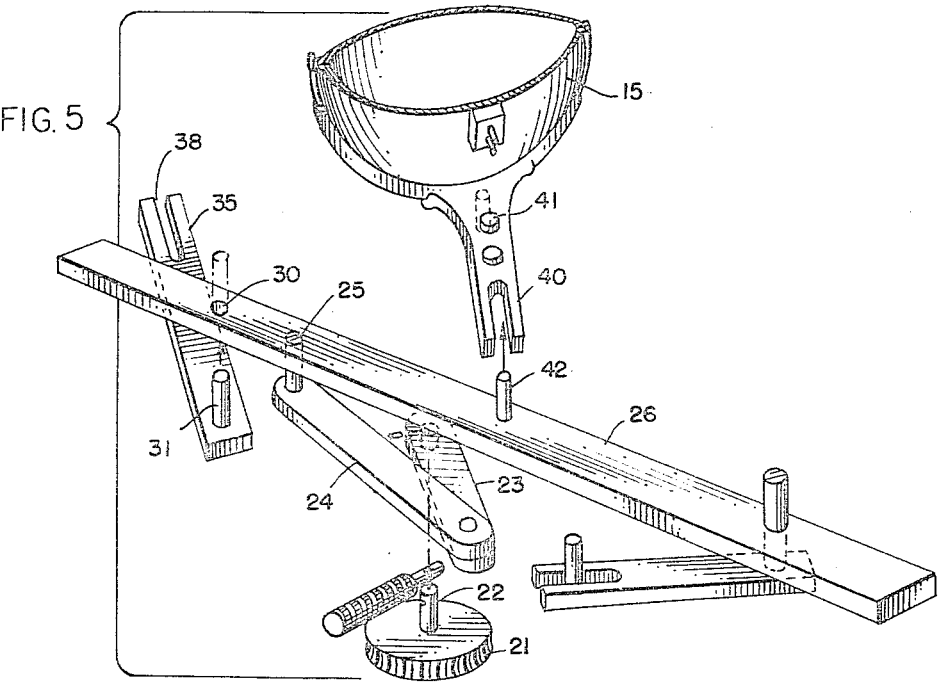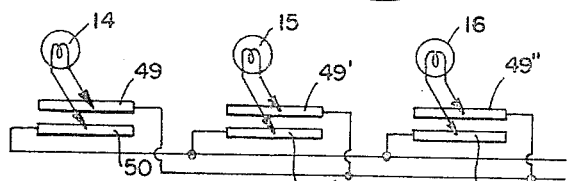

United States Patent Office 3,309,661
Patented Mar. 14, 1967

3,309,661
SIGNAL DEVICE
Jeremiah Daniel Kennelly, 408 S. Oak Park Ave.,
Oak Park, Ill. 60302
Filed Sept. 10, 1964, Ser. No. 395,386
2 Claims. (Cl. 340—50)

This invention relates to a signal device and, more particularly, to a warning device in the nature of oscillating lights which are especially adapted for emergency vehicles.

An important object of the invention is to provide a novel warning device characterized by the fact that it presents a unique light pattern to the viewer. As such, the device has particular application to fire emergency vehicles which require distinctive patterns of warning so as to differentiate them from other vehicles equipped with emergency lights.

At the present time, warning lights are used by police vehicles, ambulances, tow trucks, etc., and the public experiences difficulty in distinguishing between various warning signals. It is believed especially important to have a distinctive warning signal for fire emergency vehicles because of their bulk and the number of passengers. The bulk not only means a considerable investment in money which can be lost through a damaged vehicle, but more importantly, difficulty in stopping quickly if the warning signal is not heeded. Even more importantly, the vehicle may carry a dozen or so men whose lives would be endangered should a collision occur. Equally importantly, the object of the vehicle is an emergency generally involving danger to life, i.e., a fire, heart failure, shock, etc.

In the past, a wide variety of light signals in the nature of warnings have been used for emergency vehicles, particularly fire trucks and police vehicles. These have utilized many colors of beams and pattern configurations. In each case, the initial appearance of the warning device has achieved the desired object, but as time progressed, the public became accustomed to the warning pattern and less sensitive to heeding it immediately. The ideal, therefore, is to provide a warning device capable of developing a warning pattern so distinctive as to create an immediate reaction in the viewer each time, no matter how often it is repeated. The provision of such a warning device constitutes another object of the invention.

Still another object of the invention is to provide a warning device in which a pair of beam-type lamps are oscillated so as to develop an overlapping arc in a portion of the respective oscillations. This results in a uniquely reinforced beam adapted to be directed forwardly of the vehicle wherein the beam intensity creates an almost uncomfortable reaction in the eye and mind of the viewer so as to achieve instantaneous reaction.

Other objects and advantages of the invention may be seen in the details of construction and operation of the invention.

The invention is described in conjunction with an illustrated embodiment in the accompanying drawings, in which:

FIG. 1 is a front elevational view of the warning device constructed according to the teachings of the invention and which is adapted to be mounted atop the cab of an emergency vehicle;

FIG. 2 is a top plan view of the central fragment of the device of FIG. 1 and without the superposed globe or glass;

FIG. 3 is a fragmentary plan view of the means for oscillating the lamps of FIGS. 1 and 2, with portions of FIG. 3 being in section;

FIG. 4 is a fragmentary sectional view, on enlarged scale, such as would be seen along the sight line 4—4 applied to FIG. 2;

FIG. 5 is an exploded view of a fragmentary portion of the apparatus and featuring the means for oscillating the various lamps; and FIG. 6 is a schematic wiring diagram for powering the lamps of FIG. 2.

In the illustration given and with particular reference to FIG. 1, the numeral 10 designates a housing which is adapted to be secured to an emergency vehicle and, as illustrated in FIG. 1, the viewer is viewing the front side of the apparatus or device.

Mounted atop the housing 10, which is relatively elongated sidewise of the vehicle carrying the same, are three light sources 11, 12 and 13 in proceeding from the left to the right. The light sources 11 and 13 may be red and green flashers, respectively, so as to provide a distinctive contrast with the central source 12. The central source 12 includes three beam-type lamps 14, 15 and 16. The lamps 14 and 16 are essentially forwardly-facing (see FIG. 2 wherein the arrow designated F indicates the front of the vehicle), while the lamp 15 is essentially rearwardly-facing.

In FIG. 2, it will be noticed that the dotted line showings correspond to the other extreme of movement or oscillation of the lamps shown in heavy line and that each lamp is arranged for pivotal movement over an arc of between about 70° and about 90°. In the illustration given, the lamps are arranged for 80° of arcuate travel each, with the forwardly-facing lamps 14 and 16 arranged to have their beams overlap during 40° of mutual travel. Further, it is seen that the lamp 15 is oriented essentially oppositely to the lamp 14.

The lamps are all arranged to oscillate about vertical axes, with the arcs of movement for corresponding parts lying in the same horizontal plane.

The means for achieving the above described oscillatory operation can be appreciated from a consideration of FIGS. 3 and 5. In FIG. 3, the numeral 17 designates a motor which is suitably secured as by bolts 18 to the housing 10. The shaft tension 19 of the motor 17 is equipped with a worm as at 20 (still referring to FIG. 3) which is operably associated with a worm gear 24. The worm gear 21 is fixed to an unstanding shaft 22 which carries a crank arm 23 (see also FIG. 5). In turn, the crank arm 23 is pivotally connected to a link 24 which in turn is equipped with an upstanding post 25 for pivotal connection with an elongated bar 26.

Referring again to FIG. 3, it will be seen that the bar 26 is mounted for reciprocal movement between parallel ways 27 and 28. Thus, the crank type linkage system connecting the motor 17 with the bar 26 converts rotary motion to reciprocatory motion. The ways 27 and 28 may be advantageously secured to the underside of the platform 29 providing the support for the lamps 14–16. In this connection, it is seen in FIG. 4 that the ways 27 and 27' are generally L-shaped for the receipt of the elongated bar 26.

For the purpose of oscillating each of the lamps 14 and 16, the bar 26 is apertured as at 30 (still referring to FIG. 4) for the receipt of a vertical post 31. The post 31 is seen to be pinned as at 32 to the lamp base 33 and further pinned as at 34 to a fork 35. The lamp base 33 is equipped with a smooth bottom surface as at 36 to develop a slip-fit relative to the platform or table 29. At the rear portion of the lamp, the table 29 is apertured for the press-fit receipt of a fixed pivot 37 which is received within the slot 38 of the fork 35 (see particularly FIG. 3).

In operation, as the bar 26 reciprocates (compare FIGS. 4 and 5), the post 31 is reciprocated accordingly. The rear end of the fork 35 is fixed by the stationary pivot rod 36, although the fork moves longitudinally relative to the pivot rod in the direction indicated by the arrows designated 39 in FIG. 4. This results in the lamp 14 (for example) moving over an arc the limits of which are defined by the solid and dotted line showings in FIG. 4, i.e., the showing in solid line as at 14a and the showing in dotted line as at 14b.

The lamp 16 is oscillated by means of a similar linkage except for the fact that the pivot post 37 is arranged forwardly of the driving bar 26 rather than rearwardly, so that an essentially opposite oscillation is developed. In the showing in FIG. 2, the lamps 14 and 16 in the positions designated 14a and 16a, respectively, throw their beams in overlapping relation, while the dotted line showings as at 14b and 16b show the lamps in the position wherein their beams are separated by about 80°.

The rearwardly-projecting lamp 15 is seen to be mounted on the table 29, but with the fork 40 thereof (see FIGS. 2 and 5) mounted on the driving bar 26. The pivot post 41 is however in a stationary position relative to the table 29. For the purpose of oscillating the lamp 15, the driving bar 26 is equipped with an upstanding post 42.

Each lamp 14–16 may be advantageously powered by spring-loaded brushes of the type shown relative to the lamp 14 in FIG. 4. There, the lamp base 33 is seen to be equipped with a pair of insulating holders 43 and 44 which provide the mounting for brushes 45 and 46 which are urged downwardly by springs 47 and 48, respectively. The brushes 45 and 46 ride on bus bars 49 and 50 suitably insulated from the table by means of an insulating plate 51.

The electrical circuitry for powering the lamps 14–16 is seen in FIG. 6, wherein the bus bars 49, 49' and 49" are arranged in parallel, and the bus bars 50, 50' and 50" are likewise so arranged relative to the line voltage shown at the extreme right in FIG. 6.

In a commercial embodiment of the invention, the red and green flashers 11 and 13 are advantageously equipped with 100-candlepower lamps with the globes or housings developing the desired color. The housing 52 for the three lamps 14–16 is transparent, with the lamps 14–16 also being advantageously selected at 100 candlepower. In the commercial embodiment, the rate of oscillation is of the order of 60–70 cycles per minute.

While in the foregoing specification a detailed description of an embodiment of the invention has been set down for the purpose of explanation thereof, many variations in the details herein given may be made by those skilled in the art without departing from the spirit and scope of the invention.

I claim:

1. A signal device for emergency vehicles, or the like, comprising a frame, a pair of beam lamps mounted on said frame in spaced-apart relation for pivotal movement about generally vertical axes, and means on said frame for oscillating said lamps about their respective axes in arcs in a common plane so that the beams therefrom are in overlapping relation for a portion of each oscillation.

2. The signal device of claim 1 in which said means includes a linkage for pivoting each lamp over an arc of from about 70° to about 90°, said beams overlapping for about one-half the arcuate movement thereof.

References Cited by the Examiner
UNITED STATES PATENTS

| | | | |
|---|---|---|---|
| 2,259,790 | 10/1941 | Auten | 318 |
| 2,345,382 | 3/1944 | Cramer | 240—49 |
| 2,581,010 | 1/1952 | Findley et al. | 15—250.16 X |
| 2,642,522 | 6/1953 | McDowell et al. | 240—48 |

NEIL C. READ, *Primary Examiner.*

I. J. LEVIN, *Assistant Examiner.*